United States Patent [19]

Kamei et al.

[11] Patent Number: 4,702,745
[45] Date of Patent: Oct. 27, 1987

[54] PROCESS FOR DEWATERING HIGH MOISTURE, POROUS ORGANIC SOLID

[75] Inventors: Takao Kamei, Ashiya; Fuminobu Ono; Keiichi Komai, both of Akashi; Takeshi Wakabayashi, Kobe; Takayuki Ogawa, Yokohama; Hideaki Ito, Chigasaki; Kiyoshi Shirakawa, Machida, all of Japan

[73] Assignees: Kawasaki Jukogyo Kabushiki Kaisha, Kobe; Electric Power Development Co., Ltd., Tokyo, both of Japan

[21] Appl. No.: 857,944

[22] Filed: May 1, 1986

[30] Foreign Application Priority Data

May 2, 1985 [JP] Japan ................................ 60-94948

[51] Int. Cl.$^4$ ........................... C10L 5/06; F26B 5/04
[52] U.S. Cl. ................................ 44/10 D; 44/10 H; 44/33; 44/10 E; 34/9; 34/15
[58] Field of Search ............. 44/10 E, 10 H, 1 G, 44/10 A, 10 B, 10 D, 33; 34/9, 9.5, 13.8, 15, 16.5

[56] References Cited

U.S. PATENT DOCUMENTS

| | | | |
|---|---|---|---|
| 1,121,204 | 12/1914 | Rigby | 44/33 |
| 1,369,611 | 2/1921 | Bosch | 44/33 |
| 1,965,513 | 7/1934 | Ruzicka | 44/33 |
| 4,285,140 | 8/1981 | van Raam et al. | 34/15 |
| 4,486,959 | 12/1984 | Chang | 44/1 G |
| 4,571,300 | 2/1986 | Schraufnagel | 44/1 G |

FOREIGN PATENT DOCUMENTS

| | | | |
|---|---|---|---|
| 112903 | 10/1978 | Japan | 44/1 G |
| 1146453 | 3/1985 | U.S.S.R. | 44/33 |

*Primary Examiner*—Carl F. Dees
*Attorney, Agent, or Firm*—Leydig, Voit & Mayer

[57] ABSTRACT

A high moisture porous organic solid is dewatered by the steps of (1) heating the high moisture porous organic solid in a fluid medium having an elevated temperature and a high pressure, thereby reducing the moisture of the solid, (2) starting to compress the porous structure of the solid by mechanical means, while maintaining the temperature and the pressure of the surrounding fluid medium the same as in the final stage of step (1), and (3) lowering the pressure of the surrounding fluid medium while maintaining the mechanical compression of the solid, whereby the quality of the porous solid, such as apparent density and calorific values of moist solid per weight as well as per volume are considerably improved.

28 Claims, 7 Drawing Figures

PROCESS FOR DEWATERING HIGH MOISTURE, POROUS ORGANIC SOLID

BACKGROUND OF THE INVENTION

[1] Field of the Invention

This invention relates to a process for efficiently dewatering a high moisture, porous organic solid such as brown coal, lignite, sub-bituminous coal, peat, wood chips, organic solid wastes, etc.

[2] Description of the Prior Art

High moisture, porous organic solids, especially brown coal which has an enormous reserve on the earth, are highly required to be utilized effectively. However, brown coal has the following problems:

(1) It is highly porous with many fine capillaries and its calorific value per volume is low.

(2) Water fills its capillaries and thus it is high in moisture content and low in calorific value per weight.

(3) It will be broken and become powder, when dried, due to the uneven shrinkage of its capillary structure with the result it will be hard to handle, and in danger of igniting.

Therefore, the long distance transportation of brown coal is technically as well as economically difficult, and thus its utilization is limited only at the places near the mine. Raw brown coal will not be sufficiently dewatered even if it is mechanically compressed, because the solid will soon float in the expelled water therefrom, the applied compressing load will not be transmitted to the brown coal solid structure any more and no satisfactory mechanical compression can be attained.

The following procedures are known to dewater brown coal:

(a) Drying brown coal evaporatively in advance until it has an appropriate moisture content, and then briquetting it under a mechanical compression.

(b) Dewatering brown coal mainly without evaporation by heating brown coal to a high temperature, such as 200°-300° C. under high enough pressure to prevent completely or partially the evaporation of the moisture therefrom, (c) Mechanically compressing brown coal during heating under a high pressure similar to the procedure (b), as disclosed in British Pat. No. 496,680, and (d) After heat-treating brown coal under a high pressure similar to the procedure (b), reducing the surrounding pressure to a secondary level and then mechanically compressing the coal, as disclosed in Japanese Patent Application Kokai (Laid-open) No. 56-79189 (Austrian Patent Application 7301/79).

Procedure (a) has already been established industrially, but still has the following problems: (1) the drying consumes large latent heat for moisture evaporation, with the result of a poor economy, (2) a large mechanical compressing load is required and (3) an expensive binder often is required, depending upon the species of brown coal, to produce satisfactorily compacted briquettes. Generally, briquetting under a mechanical compression without any binder is only possible in the case of soft brown coal low in coalification rank.

Procedure (b) has advantages in improving the brown coal quality. Especially in the case of heating brown coal in saturated steam or in hot water, evaporation of moisture from the brown coal is completely suppressed, and the moisture can be removed in a liquid state from the brown coal accompanied with the corresponding shrinkage of capillaries. This procedure requires heat only to elevate the coal temperature and not to evaporate the moisture and thus the heat consumption is small. This process can dewater brown coal of lump size as it is without any breakage, because of the uniform shrinkage of the coal structure but still has the following problems: (1) The moisture remaining at the end of heating step is evaporated at the depressurizing stage to take out the coal from the high pressure to atmosphere, leaving void capillaries in the brown coal, and thus the calorific value per volume does not become satisfactorily high, and (2) a very high fluid pressure is required to leave no remaining moisture when the heating step is ended, and this is not economical. Even if the brown coal heat-treated under the high fluid pressure as above is pulverized and briquetted under a mechanical compression, no satisfactory compaction can be obtained because the quality of brown coal has been changed by the heat treatment, i.e. the soft brown coal has turned hard, the quality of brown coal has approached to that of relatively high rank coal in coalification, and the feasibility of forming biriquettes has been deteriorated.

According to the said procedure (c), brown coal can be readily deformed because it softens at a high temperature, but there are still the following problems: (1) since the capillaries shrunk by heating are filled with moisture it is hard to transmit a mechanical compressing load to the brown coal structure thoroughly and thus no satisfactory compaction can be obtained, and (2) the residual moisture at the end of heating and compaction evaporates at the depressurization, leaving void capillaries in the brown coal.

Procedure (d) has the following problems: (1) the heated brown coal is deprived of the latent heat of vaporization of moisture during the depressurization to the secondary level, and cooled and hardened, and thus it is hard to briquette the brown coal, and (2) the residual moisture evaporates at the depressurization to the atmospheric pressure after the mechanical compression, leaving void capillaries in the brown coal.

SUMMARY OF THE INVENTION

An object of the present invention is to solve the foregoing problems and to provide a process for dewatering a high moisture porous organic solid comprising steps of (1) heating the high moisture porous organic solid in a fluid medium having an elevated temperature and a high pressure, thereby softening and shrinking the porous structure of the solid, thereby improving the quality of the solid, thereby lowering the viscosity of the moisture, thereby reducing the moisture of the solid, (2) starting to compress the porous structure of the solid by mechanical means, while maintaining the temperature and the pressure of the surrounding fluid medium the same as in the final stage of the step (1), thereby consolidating the softened solid, expelling the low viscosity moisture from the capillaries of the solid, and then, (3) lowering the pressure of the surrounding fluid medium, thereby evaporating the residual moisture, while maintaining the mechanical compression of the solid, thereby collapsing the void capillaries left by the evaporated moisture, and thus obtaining a strong lump-formed solid having an improved quality and high calorific values both per volume and weight.

According to a first aspect of the present invention, a high moisture porous organic solid is dewatered by the process comprising steps of
(1) heating the high moisture porous organic solid in a fluid medium having an elevated temperature and a high pressure, thereby reducing the moisture of the solid,
(2) starting to compress the porous structure of the solid by mechanical means, while maintaining the temperature and the pressure of the surrounding fluid medium the same as in the final stage of the step (1), and
(3) lowering the pressure of the surrounding fluid medium while maintaining the mechanical compression of the solid.

According to a second aspect of the present invention, a high moisture porous organic solid is dewatered by the process comprising steps of
(1) heating the high moisture porous organic solid in a fluid medium having an elevated temperature and a high pressure, thereby reducing the moisture of the solid,
(2) starting to compress the porous structure of the solid by mechanical means, while maintaining the temperature and the pressure of the surrounding fluid medium the same as in the final stage of the step (1), and
(3) lowering the pressure of the surrounding fluid medium while maintaining the mechanical compression of the solid, wherein the steam and/or the hot water released from the step (3) is used to preheat the high moisture porous organic solid in the early stage of the step (1).

In the present invention, the said high moisture, porous organic solid is preferred to be a low-rank coal, especially brown coal or lignite, and to contain more than 40% of moisture by weight before dewatered.

The said fluid medium in which the solid is to be heated is preferably water and/or steam, and is of a static pressure of more than 10 atmospheres absolute and a temperature of more than 180° C., desirably between 230° C. and 350° C. at least in the final stage of the said heating step (1).

It is preferred to carry out substantially all or at least a part of the step (1) so as to heat the solid in a fluid which supresses the evaporation of the moisture, thereby removing the moisture from the solid as in liquid state.

From the viewpoint of the dewatering effect, both the lowering of the fluid pressure and the mechanical compression of the solid structure in step (3) are preferably carried out completely continuously, but to simplify the apparatus or the process control both or either of them can be carried out stagewise.

If the fluid pressure is lowered stage by stage, the void capillaries generated at each stage should be collapsed by the mechanical load before each of the next stage. The mechanical load to compress the solid can be reduced or released for a short period during the step (3) to promote the evaporation of the moisture, but in any case, it is preferred that the final release of the mechanical load from the solid is carried out after the fluid pressure is lowered down to atmospheric pressure.

The present invention can be carried out either batchwise or continuously. In a batch process the pressure within the chamber is reduced to atmospheric level each time it is charged with the raw solid and discharged with the product. It is convenient to provide a plurality of batch chambers to heat the solid and to supply the fluid released from a chamber undergoing step (3) into another chamber undergoing the early stage of step (1) to preheat the solid therein.

In a continuous process the heating step (1) or at least the final stage of the heating step (1) is carried out in a chamber in which the fluid medium having an elevated temperature and a high pressure is located.

To charge the raw solid into the continuous heating chamber, it is preferred to provide at least one, desirably not less than two of preheating chambers.

In continuous processes, it is necessary to provide sealing feeders of the solid to seal the high pressure fluid medium in the heating and the preheating chambers. For this purpose, a lock-hopper system or a stamping extruder or a screw extruder or most of any other known sealing extruders can be used. The raw high moisture, porous organic solid can be mixed with water or other liquid to form a slurry, so that a slurry pump can also be used as a sealing feeder.

In a continuous process, it is also necessary to provide a sealing discharger of the solid to seal the high pressure fluid medium in the heating chamber. However, in a preferrable aspect of the present invention, there is no need to provide a sealing discharger separately, since the mechanical compressing means for step (3), such as screw extruder, stamping extruder etc. has a material sealing function itself. In a continuous process, it is also preferred to provide two or more chambers to lower the pressure of the surrounding fluid medium. The heating step (3) of the present invention can be carried out either by supplying a high pressure fluid of an elevated temperature into the heating chamber, thereby heating the solid directly, or by heating the outside of the heating chamber, thereby heating the solid surrounded by the high pressure steam evaporated from the solid. It is also possible to combine the two heating procedures as described above.

PREFERRED EMBODIMENTS OF THE INVENTION

The present invention will be described in detail below, referring to a case using brown coal as a high moisture, porous organic solid.

At first, a batchwise process according to the present invention will be described. The batchwise process comprises the following individual steps:
(1) A step of making an autoclave open to the atmospheric pressure,
(2) a step of charging the autoclave with brown coal,
(3) a step of tightly closing the autoclave while preparing to apply an external load to the brown coal.
(4) a step of heating and pressurizing the autoclave to dewater the brown coal by supplying a fluid medium having an elevated temperature and a high pressure such as steam into the autoclave, or by externally heating the autoclave (the autoclave will be pressurized by the steam evaporated from the brown coal), or by a combination of the supplying of a fluid medium having an elevated temperature and a high pressure with the external heating, (5) a step of applying a mechanical load to the brown coal, thereby starting to compress the solid structure of the brown coal while maintaining the elevated temperature and the high pressure of the surrounding fluid medium, (6) a step of lowering the fluid pressure in the autoclave surrounding the brown coal while maintaining the mechanical compression load to the brown coal.

(7) a step of releasing the load from the brown coal when the fluid pressure in the autoclave is lowered down to atmospheric pressure, opening the autoclave, and discharging the brown coal, and (8) a step of repeating the above steps.

Steam and/or hot water discharged from the autoclave during the step (6) can be utilized in the preheating of the next batch [the early stage of the step (4)] by storing them in other tanks.

The batch process also can be carried out using two or more autoclaves. In this case, it is preferred that the batch cycle of each autoclave starts at a different time so that the steam and/or the hot water discharged from an autoclave undergoing the step (6) can be directly supplied to another autoclave undergoing the early stage of the step (4).

The continuous process according to the present invention will be described below, referring to a case of using brown coal as a high moisture, porous organic solid.

Figure 1:
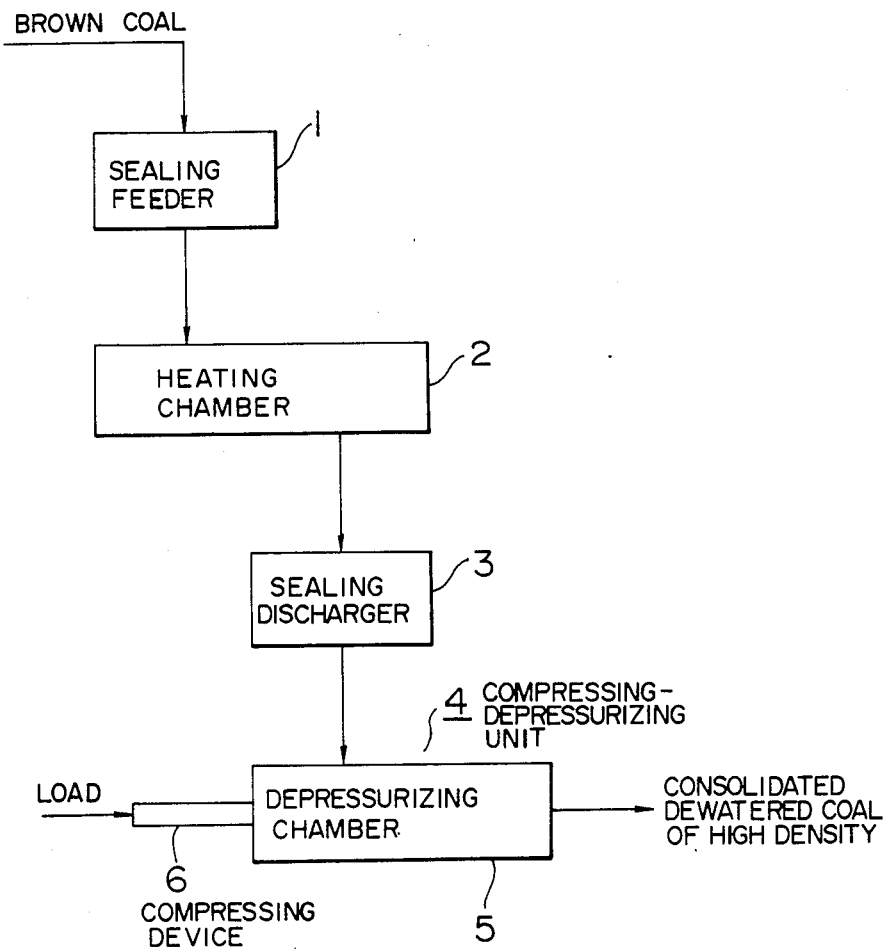
FIG. 1 is a block diagram showing one embodiment of a process for dewatering a high moisture, porous organic solid according to the present invention.

As shown in FIG. 1, brown coal is charged into a heating chamber 2 through a sealing feeder 1 which seals the high pressure fluid in the chamber 2. A lock hopper, a screw feeder, a stamping extruder, a rotary valve, etc. can be used as the sealing feeder 1. A pump also can be the sealing feeder 1 because slurried brown coal also can be used. In the heating chamber 2 brown coal is dewatered while the surrounding fluid is maintained at an elevated temperature and a high pressure by externally heating the chamber 2 or supplying a fluid of an elevated temperature and of a high pressure such as steam, etc. to the chamber 2 or by both. The dewatered brown coal is discharged through a sealing discharger 3, which seals the high pressure fluid in the chamber 2, to a compressing-depressurizing unit 4 which is composed of depressurizing chamber 5 and a compressing device 6. The brown coal in the chamber 5 is compressed mechanically and consolidated by an external load applied to the device 6, and keeping pace with this, the pressure of the fluid surrounding the coal decreases. Thus a dewatered and consolidated coal of low moisture and high density is obtained and pushed out from the unit 4 to the atmosphere by the load applied to the device 6. Instead of providing a sealing device 3 separately, the unit 4 itself can be used to seal the fluid in the chamber 2 utilizing the material sealing effect of the brown coal.

Figure 2:
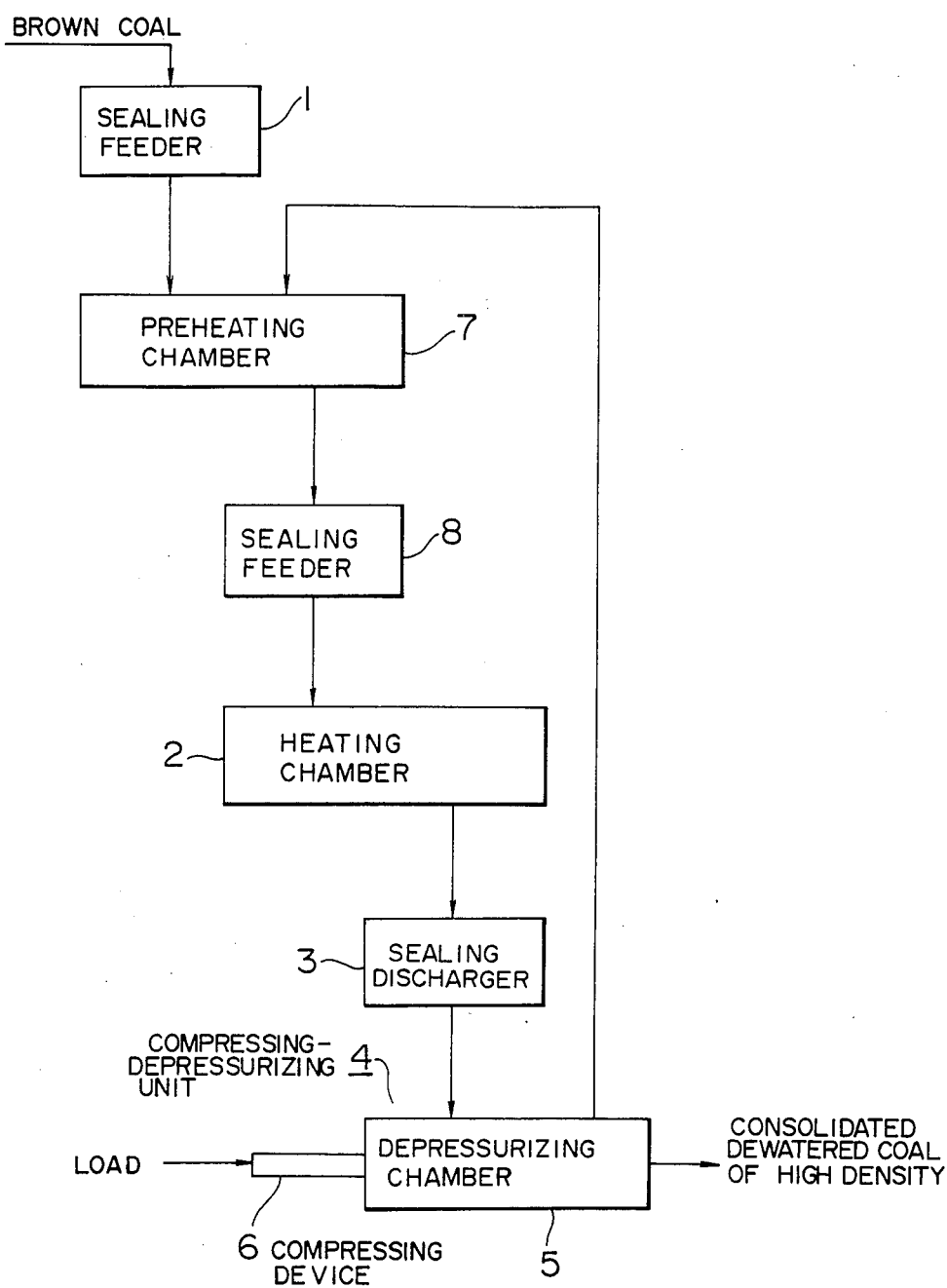
FIG. 2 is a block diagram showing another embodiment of the present invention.

As shown in FIG. 2, a preheating chamber 7 and a sealing feeder 8 can be provided between the sealing feeder 1 and the heating chamber 2 to be supplied with steam and/or the hot water discharged from the depressurizing chamber 5 for heat recovery. The preheating chamber can be composed of two stages or more with a sealing feeder each between two of them. In case that the depressurization of the fluid in the unit 4 is carried out in a multi-stage way the higher pressure fluid from the earlier stage of the chamber 5 is preferred to be supplied to the later stage preheating chamber having a higher pressure, whereby the heat consumption can be considerably reduced. This multi-staged operation has another advantage of reducing the pressure difference required to be sealed by each of the sealing feeders.

Specific embodiments of compressing-depressurizing units will be described below, referring to FIGS. 3 to 6.

Figure 3:
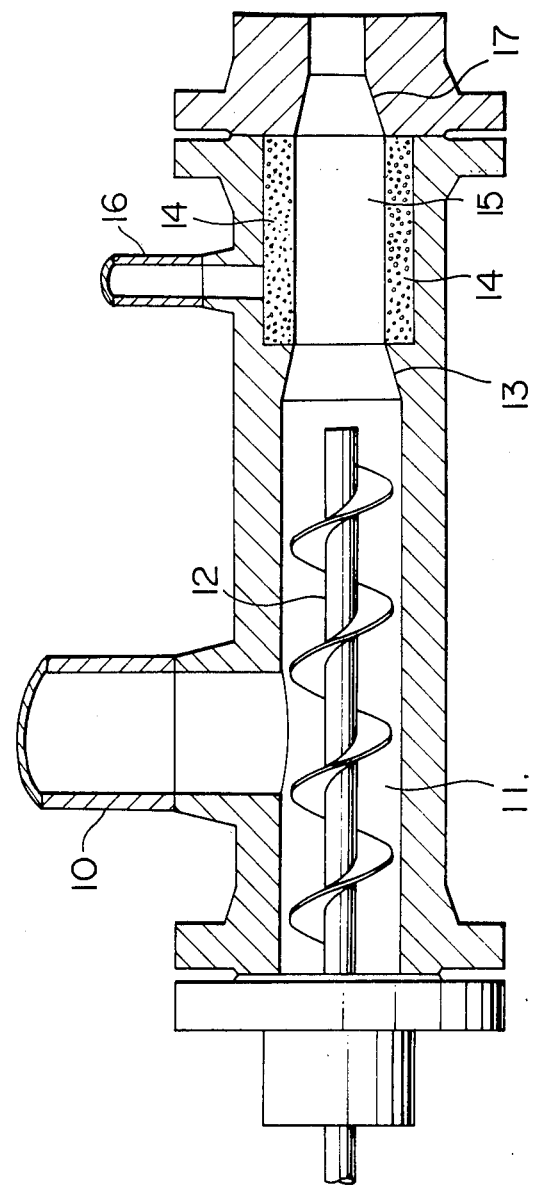
FIGS. 3 to 6 are views showing embodiments of compressing-depressuring units.

In FIG. 3, a screw extruder-type compressing-depressurizing unit is shown, where hot dewatered brown coal falls from the heating chamber 2 into a compressing chamber 11 through a chute 10 and forced to a primary tapered mould 13 by a forwarding screw 12 and compressed. Then, in a straight mould 15 steam is withdrawn from a nozzle 16 through a perforated wall 14, thereby lowering the pressure of the fluid surrounding the coal and making the remaining moisture evaporate from the coal, while the compressing load is maintained because the brown coal is forced to a secondary tapered mould 17 by the initial forwarding force of the screw 12 and then the coal is pushed to the outside. In this unit, fluid pressure sealings between the heating chamber 2 and the straight mould 15 and between the straight mould 15 and the outside are made by material seal through the tapered moulds 13 and 17, respectively. The depressurization of fluid in the straight mould can be divided into multi-stages in the axial direction, providing additional nozzles and perforated walls, and inter-sealing tapered moulds.

Figure 4:
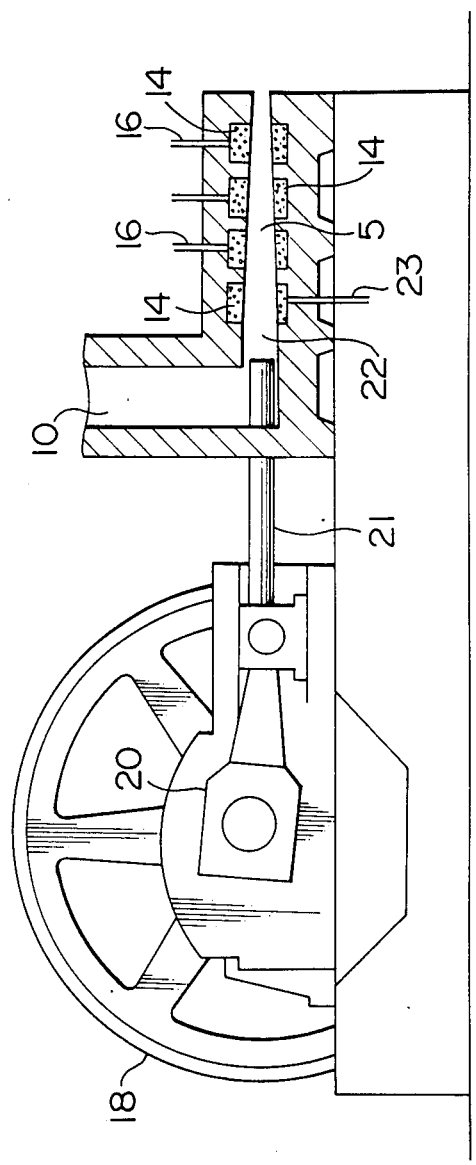

In FIG. 4, a stamping extruder-type, compressing-depressurizing unit is shown, where the hot, dewatered brown coal falls from the heating chamber 2 into the unit through a chute 10 and forced to a continuously tapered mould 22 by a stamping plunger 21 in a reciprocating motion by a crank 20 provided with a flywheel 18, and compressed. The wall of the mould 22 is composed of numbers of perforated tubes 14, each constituting a depressurizing chamber 5. In the initial depressurizing chamber, moisture squeezed from the capillaries in the brown coal by compression is withdrawn through a water-withdrawing nozzle 23 to conduct depressurization of the fluid surrounding the coal, and in the depressurizing chambers at the second and the successive stages steam is withdrawn through steam-withdrawing nozzles 16. In this unit, mechanical compression of the solid can be carried out under a higher compressing load because of using the stamping extruder instead of the screw extruder, and since the moulds are continuously tapered over a longer distance, a continuous mechanical compression can be carried out. At the initial stage of compression because of the softness of brown coal and low viscosity of moisture due to the elevated temperature, liquid water is expelled from the coal by the mechanical compression and surrounds the coal, so that it is preferred to withdraw the liquid water, as it is, in order to increase the total amount of moisture removal.

On the other hand at the later stage of compressing, it becomes difficult to expel the moisture in a liquid state, as it is, from the coak, owing to the temperature decrease due to cooling caused by the progress of the lowering of fluid pressure, and thus the moisture in a steam form is withdrawn from the tapered mould at the remaining part to conduct depressurization. The voids thus formed are collapsed by the compression. In the case of a stamping extruder, the consolidated mass formed by each stroke has discontinuous surfaces on both ends, and thus additional cutting means are not required.

Figure 5:
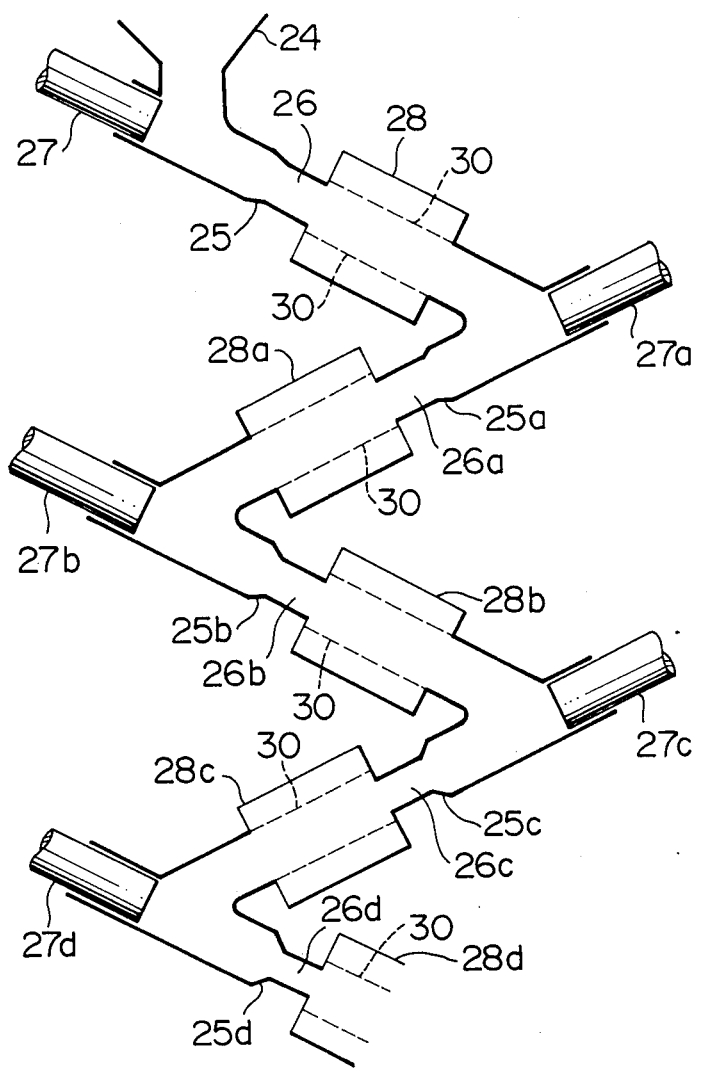

In FIG. 5, a multi-stage plunger-type compressing-depressurizing unit is shown, where hot, dewatered brown coal falls from the heating chamber 2 into a chute 24 and is stamped by a first compressing plunger 27 in an inclined first compressing chamber 26 having a first tapered mould 25, and is made to slide down along a guide 30 composed of a trough or a tube made of perforated plates in a first depressurizing chamber 28 after the compression through the first tapered mould 25. Then, in a second compressing chamber 26a inclined in the opposite direction to that of the inclined first compressing chamber 26, the brown coal is stamped by a second compressing plunger 27a, further compressed through a second tapered mould 25a and led along a guide 30 in a second depressurizing chamber 28a. The brown coal is ultimately discharged to the outside after passage through a plurality of stages similar to the above. The moisture in a steam or water form is withdrawn from the individual depressurizing chambers. FIG. 5 shows a case of 5 stages as one example, where numerals 25b, 25c and 25d show the tapered mould; 26b, 26c and 26d the inclined compressing chambers; 27b, 27c and 27d the compressing plungers; 28b, 28c and 28d the depressurizing chambers. In this unit, the perforated guide 30 can have a larger opening area than that of the perforated wall shown in FIG. 3 or 4, and the clogging of openings hardly takes place. Furthermore, the change of the compressing load requirement during each stroke can be minimized by mechanically combining each pair of successive plungers at the left and right sides or all the plungers in FIG. 5. Forces in the horizontal direction on a upstream plunger and a successive downstream plunger are opposite to each other, and thus the loads can be offset each other by mechanically combining these two plungers. The softer the brown coal and the lower the viscosity of moisture at a plunger on the more upstream side, the smaller the force requirement for the compressing. On the other hand, the higher the inside fluid pressure and the larger the plunger diameter at a plunger on the more upstream side, the larger the pressure-receiving surface and the larger the force against the inside fluid pressure. Thus, a fluctuation in the load required for each plunger can be made smaller by a design selection, for example, by selecting the shrinking ratio at each tapered mould and the inside fluid pressure at each depressurizing chamber.

Figure 6:
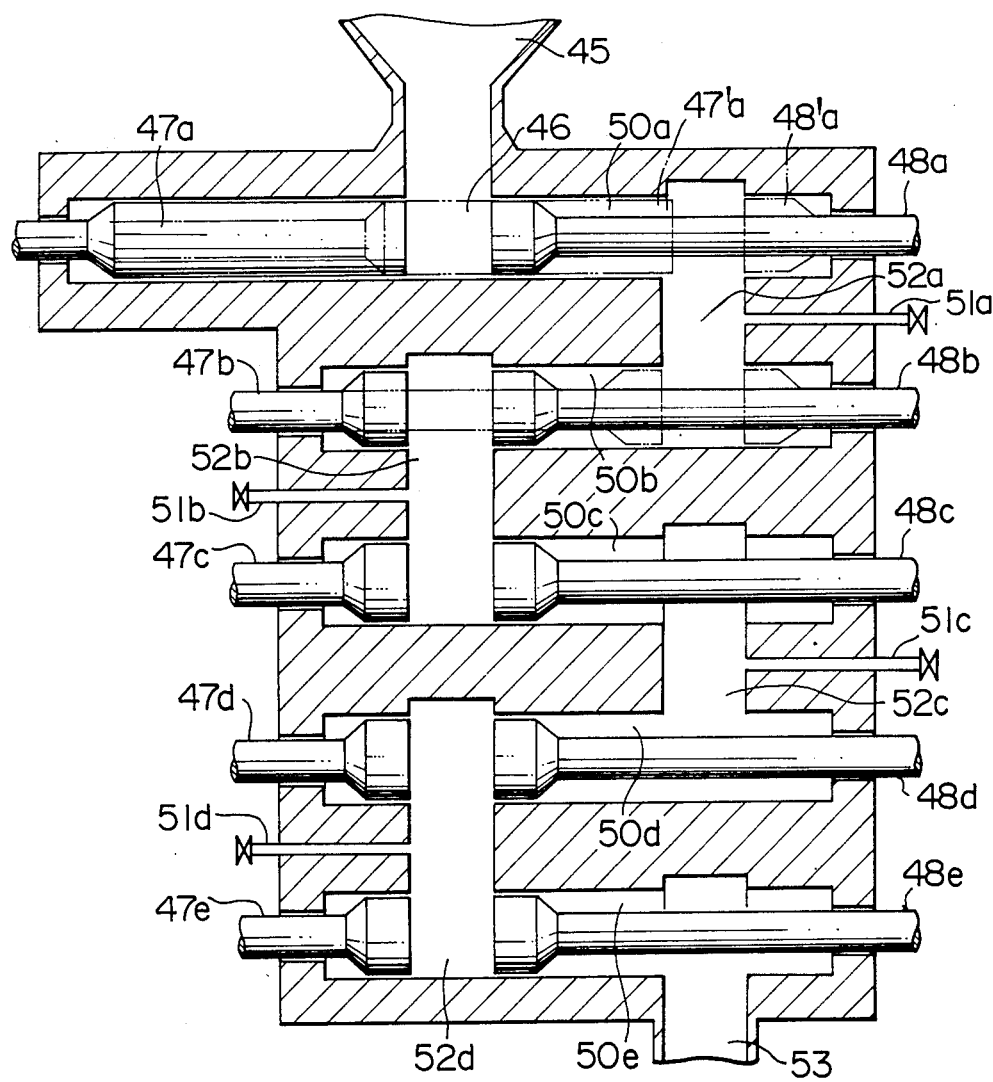

In FIG. 6, a further embodiment of the compressing-depressurizing unit is shown, where brown coal 46 falls from a heating chamber 45 into between pistons 47a and 48a, begins to be compressed in the fluid medium having the same elevated temperature and the high pressure as in the chamber 45 from both sides by two pistons 47a and 48a and moves horizontally through a passage 50a while maintaining the compression between the two pistons. When the two pistons reach positions 47'a and 48'a, respectively, shown by alternating long lines and two short dashes, the moisture evaporates long lines brown coal while being compressed, because the side surface of the brown coal is exposed to a depressurizing chamber 52a provided with a depressurizing nozzle 51a. By moving the piston 47a to the left side, the brown coal is released from the compression to fall down to the next passage 50b. Then, the brown coal is horizontally moved through the passage 50b while compressing it by pistons 47b and 48b, and made to fall down to a passage 50c through a second depressurizing chamber 52b by moving the piston 48b to the right side. Likewise, further compression and depressurization are carried out, and, ultimately, the brown coal is horizontally moved through a passage 50e to a discharge outlet 53 to the outside while compressing it by pistons 47e and 48e, exposed to the atmospheric pressure, then released from the compression and discharged to the outside.

Preferred conditions for carrying out the present invention will be described in detail below. At first, the preferred raw material to be processed by the present invention is described.

In the present invention, not only low rank coal such as brown coal, lignite, sub-bituminous coal and peat, but also wood chips, organic solid wastes and most of any other high moisture, porous organic solids can be dewatered. However, particularly in the case of the low rank coal, the product obtained according to the present invention is highly useful as fuel and thus is economically effective. Among the low rank coal, brown coal, peat, etc. having a moisture content of at least 40% by weight initially can be dewatered in the present invention with a large benefit.

In the present invention, the heating step is essentially to heat the raw material in an autoclave directly by water or steam having an elevated temperature and a high pressure supplied from the outside source. However it is also possible to generate high pressure steam from the raw material high moisture, porous organic solid itself by heating the autoclave indirectly from the outside. Usually, dewatering in the heating step is carried out so as to remove the moisture in a liquid state by suppressing evaporation of the moisture by keeping the pressure of the surrounding fluid medium not less than saturation pressure. Water or saturated steam is used for this reason. But the superheated steam also may be used because it will usually be saturated with water in the autoclave. Another preferrable alternative is to combine non-evaporative and evaporative dewaterings during heating step, which can be carried out, for example, by changing the fluid medium surrounding the material from saturated steam to superheated steam according to the progress of heating.

For most of high moisture, porous organic solids it is necessary to heat the solid to higher than 180° C., and thus it is preferable to surround the porous solid with a fluid medium having a static pressure of higher than 10 atmospheres absolute by the end of heating step (saturated pressure of water at 180° C.). Particularly, in the case of brown coal having a moisture content of at least 40% by weight, more than half of the moisture originally contained in brown coal is removed non-evaporatively when the brown coal is heated to a temperature of higher than 230° C. Consequently the volume of the brown coal is also reduced to more than 30%. The higher the final temperature of the heating step, the higher the effect of dewatering and softening of the brown coal, but it is preferable to limit the heating to not higher than 350° C. from the economical viewpoint of materials of construction for the apparatus. That is, it is preferable to determine the temperature of the surrounding fluid medium at the final stage of the heating step between 230° C. and 350° C.

Compressing and depressurizing according to the present invention will be described below.

It is preferable, from the viewpoint of forming a tight solid compression, to carry out both mechanical compression and fluid depressurization continuously, but this is only possible when the pesent invention is carried out batchwise as described before. When the present invention is carried out continuously, both or either of the depressurization of fluid and the mechanical compression of solid are carried out stagewise, as shown in the embodiments of FIGS. 4 to 6. To recover the heat released at the depressurization of fluid medium and then to increase the heat efficiency, it is preferable to carry out a multistage depressurization of the fluid, irrespective of whether a batchwise or continuous process is being used. In this case, the preheating and prepressurization of the fluid in the early stage of the heating step are carried out in multi-stage. To avoid complication of the apparatus, it is preferable to carry out the heat recovery at 4 stages in most. When it is necessary to carry out the compressing and depressurization step in more than 4 stages it is preferable to carry out the heat recovery by collecting the released fluid medium from numbers of stages into 4 groups at most. It is preferable to continue the compression until the fluid pressure reaches the atmospheric pressure. Particularly in the continuous process, it is preferable to discharge the consolidated brown coal mass to the atmospheric pressure, while pushing it out under a mechanical compression, thereby making the mass to seal the inner pressure.

Both in the heating step and the fluid pressure lowering step brown coal can be surrounded by a fluid medium other than steam or water, or by a fluid mixture of other fluid medium with steam or water. For example, it is known that the spontaneous ignition of brown coal can be reduced by contacting brown coal with oxygen at a low concentration at a temperature of about 150° C. This known art can be carried out in the present invention at an appropriate stage of the present multi-stage depressurization.

EXAMPLE 1

Figure 7:
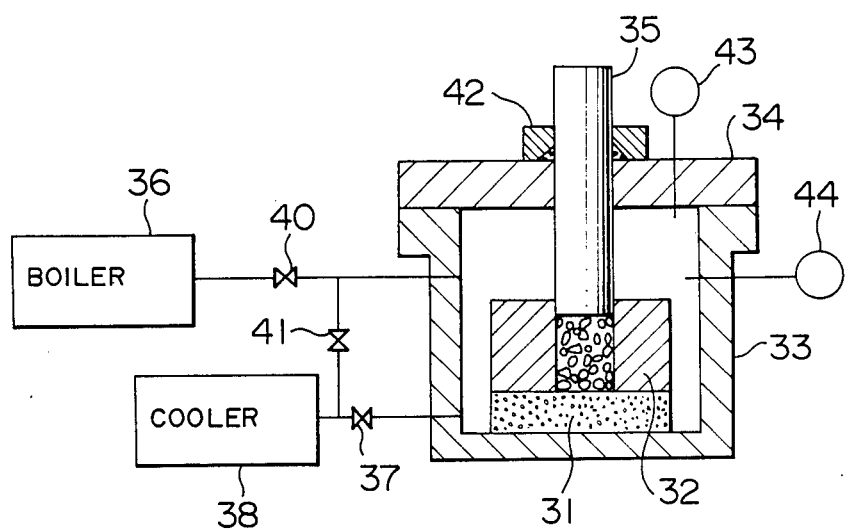
FIG. 7 is a schematic view of a testing system used in Example and Comparative Examples.

The present invention will be described below, referring to Example 1 and Comparative Examples, where tests were carried out batchwise in a testing system as shown in FIG. 7, using Australian brown coal having properties shown in Table 1 as test samples.

TABLE 1

| Item | Basis | Values |
|---|---|---|
| Moisture | as received | 65.5% |
| Ash | dry | 0.98% |
| Volatile matter | dry | 50.8% |
| Fixed carbon | dry | 48.2% |
| Calorific value | dry | 6150 kcal/kg |
| Calorific value | as received | 2120 kcal/kg |
| True density | dry | 1.44 g/cc |
| Apparent density - of each particle | as received | 1.11 g/cc |
| Bulk density - of particles filled in a vessel | as received | 0.605 g/cc |

A cylinder 32 was placed on a ceramic perforated disk 31 and a pulverized sample having particle sizes of less than 2 mm was filled in the cylinder 32. Then, the preforated disk 31 and the cylinder 32 filled with sample were set in an autoclave 33 as shown in FIG. 7, and a cover plate 34 was placed on the autoclave 33 to tightly seal the autoclave 33.

Saturated steam (260° C., 50 atmospheres gage) was supplied as a surrounding fluid medium into the autoclave 33 from a boiler by opening a valve 40 while maintaining a piston 35 which penetrated the cover plates at a constant position not to compress the sample. At the same time, hot water composed of steam condensate and the moisture removed from the sample in a liquid state was withdrawn from the autoclave 33 by opening a drain valve 37 while adjusting the degree of opening, cooled in a water-cooled cooler 38 and discharged. 5 minutes after the inside temperature of the autoclave 33 reached 258° C., a load of 100 kg/cm$^2$ was applied to the piston 35 to press down the piston and to start to compress the sample mechanically. Then, the valve 40 for feeding steam was closed, while a depressurizing valve 41 was opened to discharge the steam form the autoclave 33 to the water-cooled cooler 38 to slowly lower the steam pressure. At the same time, the piston 35 for compression was further pressed down always under a load of 100±10 kg/cm$^2$ by adjusting a external loading device (not shown in the drawing). After the steam in autoclave 33 was completely depressurized down to the atmospheric pressure, the piston 35 to compress the sample mechanically was released from the load. Then, the cover plate 34 of autoclave 33 was removed to take out the consolidated sample. Then the weight of the sample was measured, and the volume of the sample was also determined from the stroke of piston 35 to calculate the apparent density of the consolidated sample. After this measurement, the moisture and the calorific value were analyzed.

In FIG. 7, numeral 42 is a seal, 43 a pressure gage, and 44 a thermometer.

The testing results are shown in Table 2. It is seen therefrom that the calorific value on dry basis was increased by heating the coal non-evaporatively, the calorific value on wet basis per weight was about 3 times as high as that of raw brown coal because of the large moisture decrease, and the calorific value on wet basis per volume brown coal was about 4 times as high as that of raw brown coal because of the large volume shrinkage, that is, a tightly consolidated rigid briquette with a brightness was obtained.

COMPARATIVE EXAMPLE 1

The same raw coal sample as used in Example 1 was filled in the cylinder 32 in the same manner as in Example 1, but the load was applied to the piston 35 to compress the sample mechanically at the ordinary temperature under the atmospheric pressure without supplying the steam into the autoclave. The results are shown in Table 2, and it is seen therefrom that the moisture was hardly decreased only by mechanical compression. Even with increasing load, the stroke of the piston was small, and the product had many cracks. This seems that the moisture squeezed from the capillaries broken by the compression concentrated at locations to form cracks.

COMPARATIVE EXAMPLE 2

The same raw coal sample as used in Example 1 was tested in the same manner as in Example 1, except that, after the heating of the autoclave by supplying the high pressure saturated steam thereto, the depressurization of steam was carried out while maintaining the piston at a constant position not to compress the sample. The results are shown in Table 2, and it is seen therefrom that the calorific value per weight on dry basis or even on wet basis was considerably high, but that per volume was considerably lower than that of Example 1 according to the present invention. The product was not a single lump, and thus the apparent density was calculated from the volume and the weight of a lump treated likewise separately.

COMPARATIVE EXAMPLE 3

The product of Comparative Example 2 was compressed by applying a load to the piston 35 while the inner pressure of the autoclave was kept at the atmospheric level. The load was increased up to 2,000 kg/cm², but, as shown in Table 2, the apparent density of the product does not increase so much from the apparent density before mechanical compression. The product was very weak and easy to break.

COMPARATIVE EXAMPLE 4

The same raw coal sample as used in Example 1 was dried evaporatively in an electric oven to reduce the moisture content down to 19.8% by evaporation, and the thus obtained dried brown coal powder was compressed mechanically under the atmospheric pressure in the unit of FIG. 7. The applied load was 2,000 kg/cm². The test results are shown in Table 2, and it is seen therefrom that the apparent density was higher than that of Comparative Example 3, but the calorific value on the dry basis was substantially equal to that of the raw brown coal, and thus the calorific values on wet basis per weight as well as per volume were not so high.

COMPARATIVE EXAMPLE 5

The same raw coal sample as used in Example 1 was compressed mechanically in the saturated steam having the same temperature and pressure as in Example 1 under a load of 100 kg/cm² except that the load was released from the sample before the steam depressurization. The results are shown in Table 2. The moisture content of the product is lower than that of Comparative Example 3, it is considered, due to the squeezing effect of moisture from the sample by mechanical compression at the elevated temperature. Traces of crack which seem to result from the evaporation of locally concentrated moisture were observed.

COMPARATIVE EXAMPLE 6

The same raw coal sample as in Example 1 was heated in the saturated steam having the same temperature and pressure as in Example 1 and then the steam was depressurized until the temperature reached 200° C. (about 16 atmospheres absolute). Under this steam pressure a load of 100 kg/cm² was applied to the piston for mechanical compression. The results are shown in Table 2. The apparent density was higher than that of Comparative Example 5, it is considered, because the void capillaries left by the moisture evaporated before the start of compression was collapsed, and it is seen therefrom that it is hard to conduct the mechanical compression of solid when the capillaries in the solid are filled with moisture. However, the total moisture content was higher than that of Comparative Example 5, it is considered, due to the less mechanical squeezing of moisture by compression, and thus it is seen therefrom that the compression must be started at the highest temperature before the steam depressurization.

TABLE 2

| | Calorific value (dry basis) [Kcal/kg] | Total moisture (wet basis) [Wt. %] | Apparent density of consolidated lump [g/cc] | Calorific value on wet basis | |
|---|---|---|---|---|---|
| | | | | per weight [Kcal/kg] | per volume [Kcal/l] |
| Raw brown coal | 6,130 | 65.5 | 1.19 | 2,120 | 2,520 |
| Example of the present invention | 6,480 | 3.9 | 1.25 | 6,230 | 7,790 |
| Comparative example 1 | 6,130 | 60.2 | 1.14 | 2,440 | 2,780 |
| Comparative example 2 | 6,500 | 20.3 | 0.82 | 5,180 | 4,250 |
| Comparative example 3 | 6,500 | 20.3 | 0.94 | 5,180 | 4,870 |
| Comparative example 4 | 6,100 | 19.8 | 1.05 | 4,890 | 5,140 |
| Comparative example 5 | 6,490 | 9.7 | 0.98 | 5,860 | 5,740 |
| Comparative example 6 | 6,480 | 10.7 | 1.10 | 5,790 | 6,370 |

The present invention as described above has the following effects.

(1) Improvement of quality of law rank coal such as brown coal, etc., for example, an increase in the calorific value (dry basis), an increase in fuel ratio, etc. can be attained by the high temperature treatment in nonevaporative circumstances.

(2) Heat consumption for dewatering is low.

(3) Since the brown coal, etc. soften at an elevated temperature, it is easy to deform the brown coal, etc., and also it is easy to squeeze the moisture from the capillaries owing to a lowered viscosity of moisture. That is, the load required to form a strong lump can be made very low.

(4) Since the compression is maintained until the depressurization of the surrounding medium is carried out, the void capillaries formed by evaporation can be thoroughly collapsed.

(5) Rigid, lump form product of brown coal, etc. having high calorific values per weight as well as per volume can be obtained with lower heat and power consumption.

What is claimed is:

1. A process for dewatering a high moisture porous organic solid comprising steps of
   (1) heating the high moisture porous organic solid in a fluid medium having an elevated temperature and a high pressure, thereby reducing the moisture of the solid,
   (2) starting to compress the porous structure of the solid by mechanical means, while maintaining the temperature and the pressure of the surrounding fluid medium the same as in the final stage of the step (1), and
   (3) lowering the pressure of the surrounding fluid medium while maintaining the mechanical compression of the solid.

2. A process according to claim 1, wherein steam and/or hot water released from the step (3) is utilized in preheating the high moisture porous organic solid in the early stage of the step (1).

3. A porous according to claim 1, wherein the porous solid is low-rank coal.

4. A process according to claim 3, wherein the low rank coal is brown coal or lignite.

5. A process according to claim 1, wherein the porous solid contains more than 40% of moisture by weight before being dewatered.

6. A process according to claim 1, wherein the fluid medium is water and/or steam.

7. A process according to claim 1, wherein the fluid medium has a static pressure of higher than 10 atmospheres absolute at least in the final stage of the step (1).

8. A process according to claim 1, wherein the fluid medium has a temperature of higher than 180° C. at least in the final stage of the step (1).

9. A process according to claim 1, wherein the fluid medium has a temperature of between 230° C. and 350° C.

10. A process according to claim 1, wherein substantially all of step (1) is carried out so as to heat the solid in a fluid wich supresses the evaporation of the moisture, thereby removing the moisture from the solid in a liquid state.

11. A process according to claim 1, wherein both the lowering of the fluid pressure and the mechanical compression of the solid in the step (3) are carried out completely continuously.

12. A process according to claim 1, wherein the lowering of the fluid pressure in the step (3) is carried out stagewise.

13. A process according to claim 1, wherein the mechanical compression of the solid in the step (3) is carried out stagewise.

14. A process according to claim 1, wherein the final release of the mechanical compression from the solid in the step (3) is carried out after the solid is exposed to atmospheric pressure.

15. A process according to claim 1, wherein the steps (1) to (3) are carried out batchwise, using a batch heating chamber which lowers its inner pressure at each time of being charged with the solid.

16. A process according to claim 15, wherein a plurality of said batch heating chambers are provided whereby the fluid released from a chamber undergoing step (3) is supplied to another chamber undergoing the early stage of the step (1) to preheat the solid therein.

17. A process according to claim 1, wherein at least the final stage of the heating step (1) is carried out in a continuous heating chamber which keeps a high pressure fluid medium of an elevated temperature therein.

18. A process according to claim 17, wherein said solid is charged into said heating chamber through at least one preheating chamber.

19. A process according to claim 18, wherein two or more preheating chambers are provided.

20. A process according to claim 17, wherein a lock hopper system is used to seal the high pressure fluid in the heating and/or preheating chambers.

21. A process according to claim 17, wherein a stamping extruder is used to seal the high pressure fluid in the heating and/or preheating chambers.

22. A process according to claim 17, wherein a screw extruder is used to seal the high pressure fluid in the heating and/or preheating chambers.

23. A process according to claim 17, wherein said solid is supplied into said heating and/or said preheating chambers by a slurry pump.

24. A process according to claim 17, wherein the said mechanical compressing means functions to seal the high pressure fluid in the said heating chamber.

25. A process according to claim 17, wherein the lowering of the fluid pressure in the step (3) is carried out in two or more separated chambers.

26. A process according to claim 1, wherein the heating step (3) is carried out in a chamber by supplying a high pressure fluid of an elevated temperature into the heating chamber, thereby heating the solid directly.

27. A process according to claim 1, wherein the heating step (3) is carried out in achamber by heating the outside of the heating chamber, thereby heating the solid surrounded by the high pressure steam evaporated from the solid.

28. A process according to claim 1 wherein at least a part of step (1) is carried out so as to heat the solid in a fluid which suppresses the evaporation of the moisture, thereby removing the moisture from the solid in a liquid state.

* * * * *